United States Patent
Kitagawa et al.

(10) Patent No.: US 9,057,148 B2
(45) Date of Patent: Jun. 16, 2015

(54) HIGH-STRENGTH POLYPROPYLENE FIBER AND METHOD FOR PRODUCING THE SAME

(75) Inventors: Tatsuya Kitagawa, Toyota (JP); Tadahisa Iwata, Tokyo (JP); Chizuru Hongo, Tokyo (JP)

(73) Assignees: TOYOTA JIDOSHA KABUSHIKI KAISHA, Aichi-ken (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 14/119,955

(22) PCT Filed: May 30, 2011

(86) PCT No.: PCT/JP2011/062346
§ 371 (c)(1),
(2), (4) Date: Nov. 25, 2013

(87) PCT Pub. No.: WO2012/164656
PCT Pub. Date: Dec. 6, 2012

(65) Prior Publication Data
US 2014/0163169 A1    Jun. 12, 2014

(51) Int. Cl.
| | | |
|---|---|---|
| C08L 23/12 | (2006.01) | |
| C08L 23/00 | (2006.01) | |
| D01D 5/00 | (2006.01) | |
| D02G 3/02 | (2006.01) | |
| D01F 6/06 | (2006.01) | |
| D01D 5/098 | (2006.01) | |
| D02J 1/22 | (2006.01) | |

(52) U.S. Cl.
CPC .. *D02G 3/02* (2013.01); *D01F 6/06* (2013.01); *C08L 23/12* (2013.01); *D01D 5/098* (2013.01); *D02J 1/22* (2013.01)

(58) Field of Classification Search
CPC ....... D01D 5/00; D01D 5/0023; D01D 5/088; D01D 5/098; C08L 23/12; C08L 23/00
USPC ................ 526/351, 352; 428/364; 264/210.8, 264/210.2
See application file for complete search history.

(56) References Cited

U.S. PATENT DOCUMENTS

| | | | |
|---|---|---|---|
| 3,946,094 A | | 3/1976 | Kanetsuna et al. |
| 5,430,119 A | * | 7/1995 | Kouya et al. ............... 526/348.1 |
| 5,906,890 A | * | 5/1999 | Taniguchi et al. ............ 428/364 |
| 6,203,902 B1 | | 3/2001 | Ota et al. |
| 6,569,526 B2 | * | 5/2003 | Rieder et al. .................. 428/397 |
| 6,878,327 B2 | * | 4/2005 | Cooper et al. ............. 264/210.8 |
| 7,736,564 B2 | * | 6/2010 | Sakamoto et al. ......... 264/210.7 |
| 8,647,741 B2 | * | 2/2014 | Katayama et al. ............ 428/364 |
| 2003/0197304 A1 | | 10/2003 | Cooper et al. |
| 2008/0061467 A1 | | 3/2008 | Iwata et al. |
| 2010/0173547 A1 | | 7/2010 | Katayama et al. |

FOREIGN PATENT DOCUMENTS

| | | | | | |
|---|---|---|---|---|---|
| CN | 101220525 A | * | 7/2008 | ............... | D01D 5/08 |
| EP | 2130954 A1 | | 12/2009 | | |
| JP | 53-86836 | * | 7/1978 | ............... | D01F 8/06 |
| JP | 1-270907 A | * | 10/1989 | ............. | B01D 13/04 |
| JP | 02-041412 A | | 2/1990 | | |
| JP | 4-214405 A | * | 8/1992 | ............... | D01F 6/46 |
| JP | 06-041814 A | | 2/1994 | | |
| JP | 06-313207 A | | 11/1994 | | |
| JP | 07-243120 A | | 9/1995 | | |
| JP | 09-170111 A | | 6/1997 | | |
| JP | 10-183421 A | | 7/1998 | | |
| JP | 3130288 A | | 1/2001 | | |
| JP | 2004-003091 A | | 1/2004 | | |
| JP | 2007-107110 A | | 4/2007 | | |
| JP | 2009-007727 A | | 1/2009 | | |
| JP | 2009-7727 A | * | 1/2009 | ............... | D02J 1/22 |
| WO | 2006/038373 A1 | | 4/2006 | | |

OTHER PUBLICATIONS

Fukui et al. (JP 4-214405 A); Aug. 5, 1992; machine translation.*
Smith, P.; Lemstra, P.J.; Kalb, B.; Pennings, A.J. Polymer Bulletin 1979, 1, 733-736.*
Sheehan et al., "Production of Super-Tenacity Polypropylene Filaments," Journal of Applied Polymer Science, 1964, vol. 8, pp. 2359-2388.

* cited by examiner

*Primary Examiner* — Rip A Lee
(74) *Attorney, Agent, or Firm* — Sughrue Mion, PLLC

(57) ABSTRACT

A method for producing a polypropylene fiber, which can produce a high strength polypropylene fiber without using a special raw material and/or means is provided.

The method for producing a polypropylene fiber includes the step of spinning a melt extruded fiber, the step of keeping cold, and the step of drawing, in which a ratio of a take-off speed with respect to an extrusion speed in the step of spinning the melt-extruded fiber is 50 to 750.

13 Claims, 1 Drawing Sheet

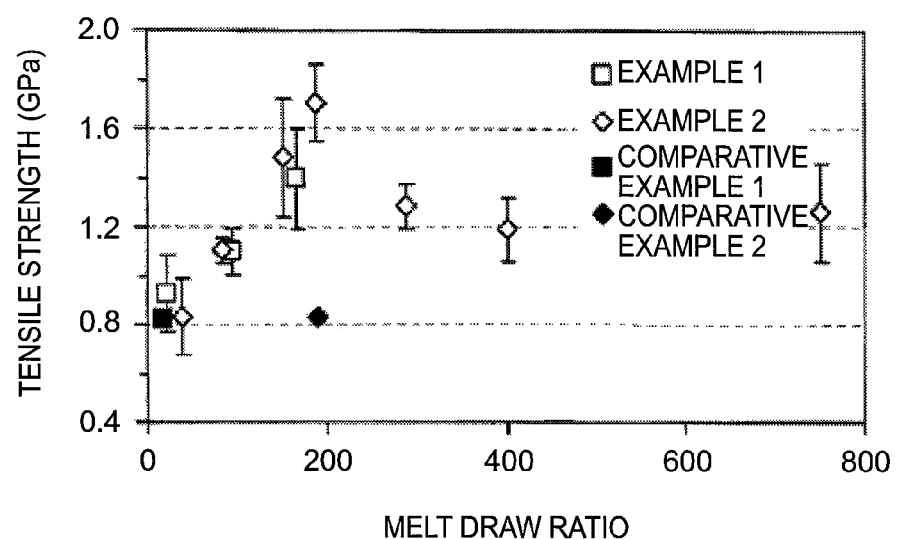

HIGH-STRENGTH POLYPROPYLENE FIBER AND METHOD FOR PRODUCING THE SAME

TECHNICAL FIELD

The present invention relates to a high strength polypropylene fiber and a method for producing the same.

BACKGROUND ART

Polypropylene (PP) is a thermoplastic resin obtained by polymerizing propylene. The PP has excellent characteristics such as a small density, a high strength, and excellent heat resistance and chemical resistance. Therefore, the PP is widely used in various applications such as fiber materials, packaging materials, containers and automobile components.

The PP fiber is usually produced by melt-spinning the PP and by drawing the spun yarn. Patent Document 1 describes a method for producing highly elastic PP, which is characterized in that an undrawn fiber obtained by spinning a crystalline PP having 1 to 5 melt-index value of product is drawn at a temperature close to the softening temperature thereof at a draw ratio close to the maximum draw ratio. This document describes that according to such a method, high elastic PP having 1 to 10 denier fineness in single yarn and an elasticity recovering energy amount of 5.0 kgfm/g or more after repetition of 10 times under load of 80% of the breaking strength can be obtained.

Patent Document 2 describes a method for producing a high strength PP fiber, which is characterized in that highly regular PP having a melt-flow rate of 5 to 15, an isotactic pentad fraction of 95 or more, a fraction insoluble in n-heptane of 98 or more and a Q value (weight average molecular weight/number average molecular weight) of 4 or less as a raw material is melt-spun at a temperature of 270° C. or more, and after that the melt-spun yarn is drawn at a high draw rate of 7 times or more to obtain the breaking strength of 8 g/d or more.

Patent Document 3 describes a method for producing a PP fiber, which is characterized in that an undrawn fiber that is formed of PP having a fraction of isotactic pentad of 96.5% or more at a melt flow rate of 3 to 100 g/10 min and has a ratio of smectic crystals of 30% or more is drawn.

Patent document 4 describes a method for producing a ultrahigh molecular weight PP drawn molded body, which is characterized in that, after a fluidity improver (C) is added to a ultrahigh molecular weight PP composition including 85 to 99.5 parts by weight of ultrahigh molecular weight polypropylene (A) of which limiting viscosity [η] is at least 5 dl/g or more, and 0.5 to 15 parts by weight of polyethylene (B) of which limiting viscosity [η] is at least 2 dl/g or more, and the mixture is melt-mixed, this is extruded from a die and molded, the resulted extruded matter is drawn. This document describes that when ultrahigh molecular weight PP is used, a PP fiber having the tensile strength of at least 0.8 GPa can be obtained.

RELATED ART DOCUMENTS

Patent Documents

Patent Document 1: Japanese Patent Application Publication No. 2-41412 (JP 2-41412 A)
Patent Document 2: Japanese Patent Application Publication No. 6-313207 (JP 6-313207 A)
Patent Document 3: Japanese Patent Application Publication No. 9-170111 (JP 9-170111 A)
Patent Document 4: Japanese Patent Application Publication No. 6-41814 (JP 6-41814 A)
Patent Document 5: WO 2006/038373 A

SUMMARY OF THE INVENTION

Problems to be Solved by the Invention

As described above, although various technologies have been developed as a method for producing a PP fiber, performances of all PP fibers are insufficient for applying to a use where a high strength is demanded like automobile components. In the method described in Patent Document 4, a special ultrahigh molecular weight PP is used as a raw material. When such a special material is used as a raw material, a production cost may be increased unfavorably.

The present inventors have developed a method for producing a fiber, which is characterized in that polyhydroxyalkanoic acid (PHA) is melt-extruded to prepare a melt extruded fiber, the melt extruded fiber is quenched to a glass transition temperature of PHA plus 15° C. or less and solidified to prepare an amorphous fiber, the amorphous fiber is left at a glass transition temperature plus 15° C. or less to prepare a crystallized fiber, the crystallized fiber is drawn, and a tense heat treatment is further applied (Patent Document 5). According to the method, strength of the resulted PHA fiber can be improved.

However, in the method described in Patent Document 5, target plastic is limited to the PHAs, and it is not clear whether a similar effect can be exerted or not also in the PP. In addition, since the PHA fiber obtained according to the method described in the Patent Document 5 has strength of about 1.3 GPa, a development of a technology for further improving the strength is demanded in applications for high strength plastic fiber such as automobile components.

Therefore, the present invention intends to provide a method for producing a polypropylene fiber, which can produce a high strength propylene fiber without using a special raw material and/or special means.

Means for Solving the Problems

The present inventors have variously studied means for solving the problems and found that by applying a technology for improving strength of the melt spinning fiber described in Patent Document 5 to a PP fiber, further by optimizing a ratio of an extrusion speed and a take-off speed during spinning by the melt extrusion, a PP fiber having extremely high strength can be produced. Thus, the present invention has been brought to completion.

That is, a gist of the present invention is as follows.
(1) A method for producing a polypropylene fiber including the following steps of:
spinning a melt-extruded fiber including melt extruding polypropylene, quenching the melt extruded fiber to a temperature in the range of a glass transition temperature of the polypropylene or more and the glass transition temperature plus 15° C. or less, and spinning while taking-off;
keeping cold the melt extruded fiber obtained in the step of spinning the melt extruded fiber at a temperature in the range of the glass transition temperature or more and the glass transition temperature plus 15° C. or less; and
drawing the melt extruded fiber kept cold in the step of keeping cold;
wherein a ratio of a take-off speed with respect to an extrusion speed in the step of spinning melt extruded fiber is in the range of 50 to 750.

(2) The method of the above item (1), wherein a ratio of the take-off speed with respect to the extrusion speed is in the range of 180 to 220.

(3) A polypropylene fiber that is produced according to the method of the above item (1) or (2) and has the tensile strength of 1.0 GPa or more.

(4) A high strength polypropylene fiber having the tensile strength in the range of 1.6 GPa to 1.87 GPa.

(5) A fiber-reinforced resin produced with the polypropylene fiber of the above item (3) or (4).

Effects of the Invention

According to the present invention, a method for producing a polypropylene fiber, which can produce a high strength polypropylene fiber without using a special raw material and/or means can be provided.

BRIEF DESCRIPTION OF THE DRAWINGS

FIG. 1 is a diagram showing a relationship between a melt draw ratio and the tensile strength of a polypropylene fiber obtained according to the method of the present invention.

MODES FOR CARRYING OUT THE INVENTION

1. Method for Producing Polypropylene Fiber

The present invention relates to a method for producing a polypropylene fiber.

In the present specification, "polypropylene" (PP) means a polymer of propylene and includes all PPs of an isotactic PP where all methyl groups have the same steric configuration, a syndiotactic PP where asymmetric carbons to which methyl groups are bonded are arranged so that steric configurations of adjacent methyl groups are opposite to each other, and an atactic PP where asymmetric carbons to which methyl groups are bonded are arranged so that steric configurations of adjacent methyl groups are irregular. Further, the PP according to the present invention may have a form of a single polymer selected from the PPs, or a form of a mixture of two or more PPs selected from the PPs. The PPs according to the present invention include all of the above forms. More specifically, the PP according to the present invention preferably has an mmmm fraction in the pentad steric regularity evaluation of 0.85 or more and more preferably 0.9 or more. Here, the mmmm fraction can be determined by a $^{13}$C-NMR method.

The polypropylene according to the present invention may have a form of homopolymer including the above PP units alone, or a form of a copolymer with other monomer. Alternatively, the polypropylene may have a form of a mixture of two kinds or more of homopolymers and/or copolymers. As the copolymer, a block copolymer and a random copolymer can be used. Copolymerizing monomers that form copolymers can include, but not limited to, ethylene and 1-butene, for example.

Usually, when the PP is molded in a form of fiber, it is known that the PP fiber having a molecular weight distribution in a narrow range shows high strength. Therefore, the PP according to the present invention preferably has a weight average molecular weight ($M_w$) in the range of 200,000 to 1,000,000. In addition, a ratio ($M_w/M_n$) of the weight average molecular weight ($M_w$) with respect to the number average molecular weight ($M_n$) is preferably 5 or less. The number average molecular weight and weight average molecular weight can be determined by a GPC method.

When the above polypropylene is used in the present invention, a polypropylene fiber having strength higher than that of the conventional technology can be produced.

Hereinafter, preferable embodiments of the method of the present invention will be described in detail.

[1. Step of Spinning Melt Extruded Fiber]

A method of the present invention includes spinning melt extruded fiber where polypropylene is melt extruded, and spinning the melt extruded fiber while quenching and taking-off.

In the present step, as means for melt-extruding PP, a melt extrusion technique of plastic fiber usually used in the concerned technical field may be used. Means for melt extruding can include, but not limited to, an extruder where after a raw material plastic is heated and melted, the melt is pressure extruded, for example. When the extruder is used in the present step, a fiber diameter of the resulted PP fiber can be reduced.

In the present step, the extrusion speed at which the PP is melt extruded may be in the range that satisfies a preferable ratio of the take-off speed with respect to the extrusion speed described below. Further, a furnace temperature at which the PP is melt extruded is preferable to be higher than the melting point of the PP used, more preferable to be the melting point plus 10° C. or more, and particularly preferable to be in the range of the melting point plus 15° C. to the melting point plus 100° C.

Now, the melting point can be determined by measuring in advance the melting point of the PP used, without particularly limiting, using a melting point meter, for example.

The present inventors found that when the method described in the Patent Document 5 is applied to production of a PP fiber, the strength of the PP fiber can be improved to the same level as that of the PHA fiber. The method described in the Patent Document 5 is characterized in that when a melt extruded fiber of PHA is quenched to a temperature in the range of the glass transition temperature or more and the glass transition temperature plus 15° C. or less, the melt extruded fiber is rendered amorphous, further, by keeping this cold at the above temperature, microcrystal nucleuses are formed in the melt extruded fiber. Since the microcrystal nucleuses become a starting point of drawing (drawing nucleus), only by one stage of drawing, the polymer molecules are highly aligned, and strength of the resulted fiber can be improved.

In the present step, a temperature at which the melt extruded fiber is quenched is preferably a temperature in the range of the glass transition temperature of the PP or more and the glass transition temperature plus 15° C. or less, and more preferably a temperature in the range of the glass transition temperature or more and the glass transition temperature plus 10° C. or less.

In the present specification, the "glass transition temperature (Tg)" means a temperature where the PP transfers from a state having the plasticity to a cured state, and, can be determined, but not limited to, by differential scanning calorimetry (DSC) or viscoelasticity measurement, for example.

In the present step, means for quenching the melt extruded fiber is not particularly limited. The melt extruded fiber may be introduced into a cooling medium of liquid or gas that is usually used in the concerned technical field. As the cooling medium used in the present step can include, but not limited to, water and ice water, and air and inactive gas such as nitrogen and helium, for example. Water or ice water is preferable. When the melt extruded fiber is quenched at the above temperature using these cooling media, the PP that forms the fiber can be rendered into an amorphous form.

A crystalline form of the obtained PP fiber can be determined by, but not limited to, X-ray diffractometry (XRD), for example.

In the present step, means for taking-off the melt extruded fiber while quenching is not particularly limited. For example, by forming a wound body by rewinding the melt extruded fiber introduced into the cooling medium about a rewinding shaft, in the cooling medium, at a predetermined take-off speed using usual take-off means commonly used in the concerned technical field, or by forming a wound body by rewinding about a rewinding shaft at a predetermined take-off speed using usual take-off means, outside the cooling medium, after allowing the melt extruded fiber introduced in the cooling medium to pass through at a predetermined take-off speed in the cooling medium, the melt extruded fiber can be taken-off while quenching. Alternatively, when the melt extruded fiber quenched by the cooling medium is housed in a pre-cooled container while taking-off at a predetermined take-off speed using usual take-off means, the melt extruded fiber can be taken-off. All the cases are included in the embodiment of the present step. The take-off means can include, but not limited to, a rewinder and a roller that forms the wound body by rewinding a fiber about a rewinding shaft such as a bobbin, for example. Further, the melt extruded fiber is preferably, while maintaining a tense state of the fiber, which is imparted by the taking-off, recovered by the above means, and supplied to the cooling step described below. For example, the wound body of the melt extruded fiber is preferably quenched according to a usual method in which both ends of the fiber are fastened to the rewinding shaft so that the fiber does not substantially relax. Further, the melt extruded fiber housed in the container is preferably quenched according to a usual method in which both ends of the fiber are fastened to the container, or one end is fastened to the container and the other end is fastened to a weight so that the fiber does not substantially relax.

The present inventors have found that when, by adjusting a ratio of the extrusion speed and take-off speed of the step, a ratio (melt draw ratio) of the take-off speed with respect to the extrusion speed is optimized in a range higher than about 20 which is usually set in the field of concerned technology, the strength of the resulted PP fiber can be largely improved compared with the PP fiber produced at usual melt draw ratio. The effect is assumed that when the melt draw ratio is optimized in a range higher than that of the conventional technology, the degree of orientation of the PP polymer molecules in the melt extruded fiber is improved, and the strength improvement effect due to the formation of microcrystal nucleus can be further improved thereby.

In the present step, the take-off speed at which the melt extruded fiber introduced in the cooling medium is taken-off is preferably in the range of 50 to 2,500 mm/sec, and more preferably in the range of 200 to 2,000 mm/sec. In addition, a ratio (melt draw ratio) of the take-off speed with respect to the extrusion speed is preferably in the range of 50 to 750, and more preferably in the range of 180 to 220. When the ratio of the take-off speed with respect to the extrusion speed is adjusted in the above range, the degree of the orientation of the PP polymer molecules in the melt extrude fiber is improved, and the strength of the resulted PP fiber can be improved thereby.

When the present step is carried out under the above condition, the melt extruded fiber of PP having an amorphous form where the degree of orientation of the polymer molecules is improved can be formed.

[2. Step of Keeping Cold]

The method of the present invention includes the step of keeping cold the melt extruded-fiber obtained in the step of spinning melt extruded fiber.

In the present step, the melt extruded fiber preferably maintains a tense state of the fiber imparted in the step of spinning melt extruded fiber. In the case of the wound body of the melt extruded fiber, for example, it is preferable to keep the fiber cold according to a usual method in which both ends of the fiber are fastened to the rewinding shaft so that the fiber does not substantially relax. Further, in the case of the melt extruded fiber housed in the container, it is preferable to keep the fiber cold according to a usual method in which both ends of the fiber are fastened to the container or one end is fastened to the container and the other end is fastened to a weight so that the fiber does not substantially relax.

In the present step, as means for keeping the melt extruded fiber cold, similar means as that of the preceding step are preferably used. A temperature at which the melt extruded fiber is kept cold is preferably a temperature in the range of the glass transition temperature of the PP or more and the glass transition temperature plus 15° C. or less, and more preferably a temperature in the range of the glass transition temperature or more and the glass transition temperature plus 10° C. It is particularly preferable that a temperature at which the melt extruded fiber is quenched in the step of spinning melt extruded fiber and a temperature at which the melt extruded fiber is kept cold in the present step be in the same range. Further, a time during which the melt extruded fiber is kept cold is preferably in the range of 3 to 72 hrs and more preferably in the range of 12 to 48 hrs.

When the present step is carried out under the above condition, in the melt extruded fiber of the PP having an amorphous form obtained by the step of spinning melt extruded fiber, microcrystal nucleuses can be formed.

[3. Step of Drawing]

The method of the present invention includes the step of drawing the melt extruded fiber kept cold in the step of keeping cold.

In the present step, as means for drawing the melt extruded fiber, a drawing technology of the plastic fiber, which is usually used in the concerned technical field, may be used. The means for drawing can include, but not limited to, a manual or mechanical drawer where the melt extruded fiber is pulled out from the wound body and is drawn by a roller, for example.

In the present step, the draw ratio is not particularly restricted in the upper limit and may be a degree where the melt extruded fiber is not broken. Specifically, the draw ratio is preferably 2 times or more and more preferably 10 times or more. A temperature at which the melt extruded fiber is drawn is preferably the glass transition temperature of the PP or more, more preferably a temperature in the range of the glass transition temperature or more and the glass transition temperature plus 50° C. or less, and particularly preferably room temperature (for example, a range of 20 to 25° C.).

The drawn fiber, after that, can be formed into a wound body by rewinding about a rewinding shaft at a predetermined specified draw speed using normal taking-off means or can be housed in a container. All cases are included in embodiment of the present step. The drawn fiber is recovered by the above means while maintaining a tense state of the fiber imparted by the drawing, and preferably supplied to the step of heat treatment described below. For example, the wound body of the drawn fiber is preferably made such that the fiber does not substantially relax according to a usual method in which both ends of the fiber are fastened to the rewinding shaft. Further, the drawn fiber housed in the container is preferably made such that the fiber does not substantially relax according to a usual method in which both ends of the fiber are fastened to the container, or one end is fastened to the container and the other end is fastened to a weight.

When the present step is carried out under the above condition, a fiber diameter of the resulted PP fiber can be reduced.

[4. Step of Heat Treatment]

The method of the present invention includes the step of heat treatment for heat treating the drawn fiber obtained in the step of drawing depending on the case.

In the present step, the drawn fiber can be heat treated while maintaining a tense state imparted in the step of drawing. Or, by releasing the tense state imparted in the step of drawing, and by heat treating in a relaxed state, the drawn fiber in the tense-less state or relaxed state can be heat treated. It is preferable to apply heat treatment while maintaining the tense state imparted in the drawing step. For example, in the case of wound body of the drawn fiber, it is preferable that, according to a usual method in which both ends of the fiber are fastened to the rewinding, the fiber is heat treated so that the fiber does not substantially relax. Further, in the case of the drawn fiber housed in the container, it is preferable that, according to a usual method in which both ends of the fiber are fastened to the container, or one end is fastened to the container and the other end is fastened to a weight, the fiber is heat treated so that the fiber does not substantially relax.

In the present step, as the means for heat treating the drawn fiber, a heater such as a dry oven usually used in the concerned technical field may be used. A temperature at which the drawn fiber is heat treated is preferably in the range of 25 to 180° C. and more preferably in the range of 80 to 140° C. A time during which the drawn fiber is heat treated is preferably in the range of 5 seconds to 120 minutes and more preferably 10 seconds to 30 minutes.

When the present step is carried out under the above condition, the high strength PP fiber can be obtained.

2. High Strength Polypropylene Fiber

As was described above, the melt extruded fiber of the PP obtained according to the method of the present invention has high degree of orientation of the PP polymer molecules in the fiber and microcrystal nucleuses that become a starting point (drawing nucleus) of the drawing in the fiber. Therefore, the PP fiber obtained by drawing the melt extruded fiber having the above features has very high strength compared with the PP fiber (usually, tensile strength of about 0.4 GPa) obtained according to a conventional method. Specifically, the tensile strength of the PP fiber produced according to a method of the present invention is usually in the range of 1.0 to 1.5 GPa, typically in the range of 1.6 to 1.87 GPa. The tensile strength can be determined based on JIS-K-6301.

Therefore, the present invention also relates to a high strength PP fiber having the above tensile strength. By having such a high tensile strength, the PP fiber of the present invention can exhibit very high strength.

3. Fiber-Reinforced Resin

The PP fiber obtained according to the method of the present invention has very high strength compared with that of the PP fiber obtained according to the conventional method. Therefore, the present invention relates to a fiber-reinforced resin produced using the high strength PP fiber of the present invention.

The fiber-reinforced resin of the present invention contains the high strength PP fiber of the present invention described above. Further, the fiber-reinforced resin of the present invention, as required, may contain one or more kinds of additives such a binder, a plasticizer, a coloring agent, a stabilizer, a lubricant, and a filler. When the above additive is contained, various functions can be imparted to the fiber-reinforced resin of the present invention.

As described above in detail, the method of the present invention can produce the high strength PP fiber without using a special raw material and/or means. Further, since the high strength PP fiber of the present invention has a high tensile strength, a fiber-reinforced resin produced using the high strength PP fiber has characteristics of light weight and high strength. Therefore, when the fiber-reinforced resin of the present invention is used, weight reduction and strength improvement of automobile components can be realized.

EXAMPLES

Hereinafter, the present invention will be described in more detail with reference to examples and comparative examples.

Preparation of High Strength Polypropylene Fiber

Examples 1 to 3

Commercially available polypropylene (PP) (FY6: $Mw=5.1\times10^5$; $Mn=1.2\times10^5$; $Mw/Mn=4.1$; mmmm fraction=0.934; Manufactured by Japan Polypropylene Corporation) was charged in an extruder, PP was melt extruded at various extrusion speeds. A melting temperature of the extruder was set to a furnace temperature of 190° C. and a die temperature of 185° C., a nozzle diameter of an extruding port was set to 0.5 mm (Example 1) or 1 mm (Examples 2 and 3). A PP fiber that was melt-extruded was rewound about a rewinding shaft at various take-off speeds while quenching at 0° C. in an ice bath, by fastening both ends of the fiber to the rewinding shaft, a wound body of the melt-extruded fiber was formed (step of spinning melt-extruded fiber). The wound body of the resulted melt-extruded fiber was kept cold in an ice bath at 0° C. for 48 hours (step of keeping cold). After the fiber was pulled out from the wound body of the melt-extruded fiber after keeping cold, and the fiber was drawn to 10 times at room temperature using a hand drawer, the fiber was wound around a rewinding shaft, and a wound body of the drawn fiber was formed (step of drawing). The wound body of the drawn fiber of which both ends of the fiber are fastened to the rewinding shaft was heat-treated at 120° C. for 5 minutes (step of heat treating), and the PP fiber of the present invention was obtained.

Comparative Example 1

This is an example of the PP fiber obtained according to the method described in Patent Document 5. The PP fiber was obtained in the same manner as the above except that the extrusion speed and the take-off speed were adjusted so that the melt draw ratio may be a value (17) in the range of conventional technology. The melt draw ratio is calculated as a ratio of the take-off speed with respect to extrusion speed.

Comparative Example 2

This is an example of the PP fiber obtained by applying the melt draw ratio of the present invention to the conventional technology. In the same manner as the above method except that by adjusting the extrusion speed and the take-off speed so that the melt draw ratio is 189, a melt-extruded fiber was taken-off at room temperature, and the step of keeping cold was omitted, the PP fiber was obtained.

Performance Test of Polypropylene Fiber

Tensile Strength Test

The tensile strength of the obtained PP fibers was measured. Measurement was performed of a sample having a fiber length of 10 mm based on JIS-K-6301. The tensile speed was set to 20 mm/sec. Results are shown in Table 1, and relationship between the melt draw ratio and the tensile strength is shown in FIG. 1.

TABLE 1

| Example | Nozzle diameter (mm) | Extrusion speed (mm/sec) | Take-off speed (mm/sec) | Melt draw ratio | Fiber diameter (μm) | Tensile strength (GPa) |
|---|---|---|---|---|---|---|
| 1-1 | 0.5 | 20 | 418 | 21 | 30 | 0.93 |
| 1-2 | 0.5 | 10 | 943 | 94 | 16 | 1.10 |
| 1-3 | 0.5 | 5.7 | 943 | 165 | 11 | 1.40 |
| 2-1 | 1 | 5.7 | 221 | 39 | 26 | 0.83 |
| 2-2 | 1 | 5 | 418 | 84 | 30 | 1.10 |
| 2-3 | 1 | 6.2 | 943 | 152 | 24 | 1.48 |
| 2-4 | 1 | 5 | 943 | 189 | 19 | 1.70 |
| 2-5 | 1 | 6.2 | 1791 | 289 | 15 | 1.28 |
| 2-6 | 1 | 4.8 | 1910 | 400 | 18 | 1.19 |
| 2-7 | 1 | 4.8 | 3581 | 750 | 15 | 1.26 |
| Comparative Example 1 | 1 | 25 | 418 | 17 | 32 | 0.82 |
| Comparative Example 2 | 1 | 5 | 943 | 189 | 20 | 0.83 |

As shown in FIG. 1, in the case of Example 1 where an extruder having a nozzle diameter of 0.5 mm was used to spin, as the melt draw ratio was made higher by adjusting the extrusion speed and the take-off speed, the tensile strength was improved. In the case of Examples 1 to 3 where the melt draw ratio was 165, the tensile strength of 1.40 GPa was shown. In the case of Example 2 where an extruder having a nozzle diameter of 1.0 mm was used to spin, when the melt draw ratio exceeds 200, the tensile strength decreased. Among the PP fibers of Example 2, the tensile strengths of Examples 2 to 4 where the melt draw ratio was 189 were highest and showed the tensile strength of 1.70 GPa.

By contrast, Comparative Example 1 prepared based on the method described in Patent Document 5, the tensile strength was 0.82 GPa. Further, Comparative Example 2 where the same melt draw ratio as that of Example 2-4 which showed the highest tensile strength in Example 2 was applied, the melt extruded fiber was taken-off at room temperature and the step of keeping cold was omitted showed the tensile strength of 0.83 GPa.

From above results, it was made obvious that when the melt draw ratio of the present invention is applied to the microcrystal nucleation technique described in Patent Document 5, the PP fiber having very high strength which could not be obtained according to the conventional technology can be produced.

INDUSTRIAL APPLICABILITY

According to the method of the present invention, without using a special raw material and/or means, the high strength PP fiber can be produced. When the high strength PP fiber of the present invention is used, the fiber-reinforced resin having light weight and high strength can be produced. Therefore, weight reduction and strength improvement of automobile components can be realized.

All of the printed publications, patents and patent applications cited in the specification are incorporated in the present specification as these are.

The invention claimed is:

1. A method for producing a high strength polypropylene fiber comprising:
    melt extruding polypropylene to obtain a melt extruded fiber;
    quenching the melt extruded fiber to a temperature in the range of from a glass transition temperature of the polypropylene to the glass transition temperature plus 15° C. to obtain a quenched fiber;
    spinning the quenched fiber while taking-off at a take-off speed in the range of 50 to 2,500 mm/s to obtain a spun fiber;
    keeping cold the spun fiber at a temperature in the range of from the glass transition temperature to the glass transition temperature plus 15° C. to obtain a kept cold fiber; and
    drawing the kept cold fiber to obtain a polypropylene fiber;
    wherein, in spinning the quenched fiber, a ratio of a take-off speed with respect to an extrusion speed is in the range of 50 to 750.

2. The method according to claim 1, wherein, in spinning the quenched fiber, the ratio of the take-off speed with respect to the extrusion speed is in the range of 180 to 220.

3. The method according to claim 1, wherein the spun fiber is kept cold within the claimed temperature range of from the glass transition temperature to the glass transition temperature plus 15° C. for a time period of from 3 to 72 hours.

4. The method according to claim 1, wherein the spun fiber is kept cold within the claimed temperature range of from the glass transition temperature to the glass transition temperature plus 15° C. for a time period of from 12 to 48 hours.

5. The method according to claim 1, further comprising heat treating the polypropylene fiber obtained from drawing the kept cold fiber.

6. The method according to claim 5, wherein the heat treating is conducted at a temperature of from 25 to 180° C.

7. The method according to claim 5, wherein the heat treating is conducted at a temperature of from 80 to 140° C.

8. The method according to claim 5, wherein the heat treating is conducted for 5 seconds to 120 minutes.

9. The method according to claim 5, wherein the heat treating is conducted for 10 seconds to 30 minutes.

10. The method according to claim 7, wherein the heat treating is conducted for 10 seconds to 30 minutes.

11. The method according to claim 10, wherein the spun fiber is kept cold within the claimed temperature range of from the glass transition temperature to the glass transition temperature plus 15° C. for a time period of from 12 to 48 hours.

12. A high strength polypropylene fiber having a tensile strength in the range of 1.7 GPa to 1.87 GPa.

13. A fiber-reinforced resin produced with the high strength polypropylene fiber according to claim 12.

* * * * *